United States Patent [19]

Mazzanti et al.

[11] Patent Number: 4,855,387

[45] Date of Patent: Aug. 8, 1989

[54] POLY(ARYLENE ETHER KETONES) HAVING BIPHENYLENE-4,4'-DICARBONYL GROUPS

[75] Inventors: John B. Mazzanti, Belmont; Stephen Moore, Redwood City, both of Calif.

[73] Assignee: Raychem Corporation, Menlo Park, Calif.

[21] Appl. No.: 72,190

[22] Filed: Jul. 9, 1987

[51] Int. Cl.$^4$ .................. C08G 8/02; C08G 14/00
[52] U.S. Cl. ..................... 528/125; 528/126; 528/128; 528/220
[58] Field of Search .......... 528/125, 126, 128, 220

[56] References Cited

U.S. PATENT DOCUMENTS

| | | | |
|---|---|---|---|
| 3,441,538 | 4/1969 | Marks | 528/86 |
| 3,516,966 | 6/1970 | Berr | 528/194 |
| 3,524,833 | 8/1970 | Darnes | 528/176 |
| 3,953,400 | 4/1976 | Dahl | 528/179 |
| 3,956,240 | 5/1976 | Dahl | 528/125 |
| 4,111,908 | 9/1978 | Dahl | 528/361 |
| 4,320,224 | 3/1982 | Rose et al. | 528/125 |
| 4,668,744 | 5/1987 | Matzner et al. | 528/125 |

FOREIGN PATENT DOCUMENTS

| | | |
|---|---|---|
| 184458 | 11/1986 | European Pat. Off. |
| 1086021 | 10/1967 | United Kingdom |
| 84/039891 | 10/1984 | World Int. Prop. O. ......... 528/185 |

OTHER PUBLICATIONS

Olah, Friedel–Crafts and Related Reactions, vol. III, pp. 46–47, (1963–4).

Primary Examiner—John Kight
Assistant Examiner—M. L. Moore
Attorney, Agent, or Firm—Yuan Chao; Edith A. Rice; Herbert G. Burkard

[57] ABSTRACT

Novel copoly(arylene ether ketones) having a biphenylene-4,4'-dicarbonyl group in their backbone, comprising (A) a repeat unit

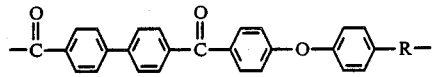

and (B) a repeat unit selected from the group consisting of

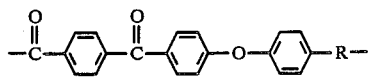

and

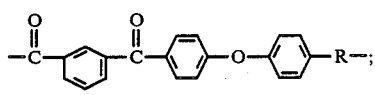

where R, which is the same in each of repeat units (A) and (B), is a direct bond,

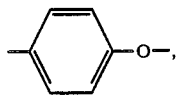

or

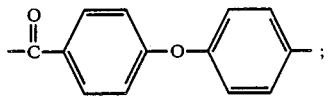

the molar ratio of repeat units (A) to repeat units (B) being between about 10:90 and about 70:30.

15 Claims, 2 Drawing Sheets

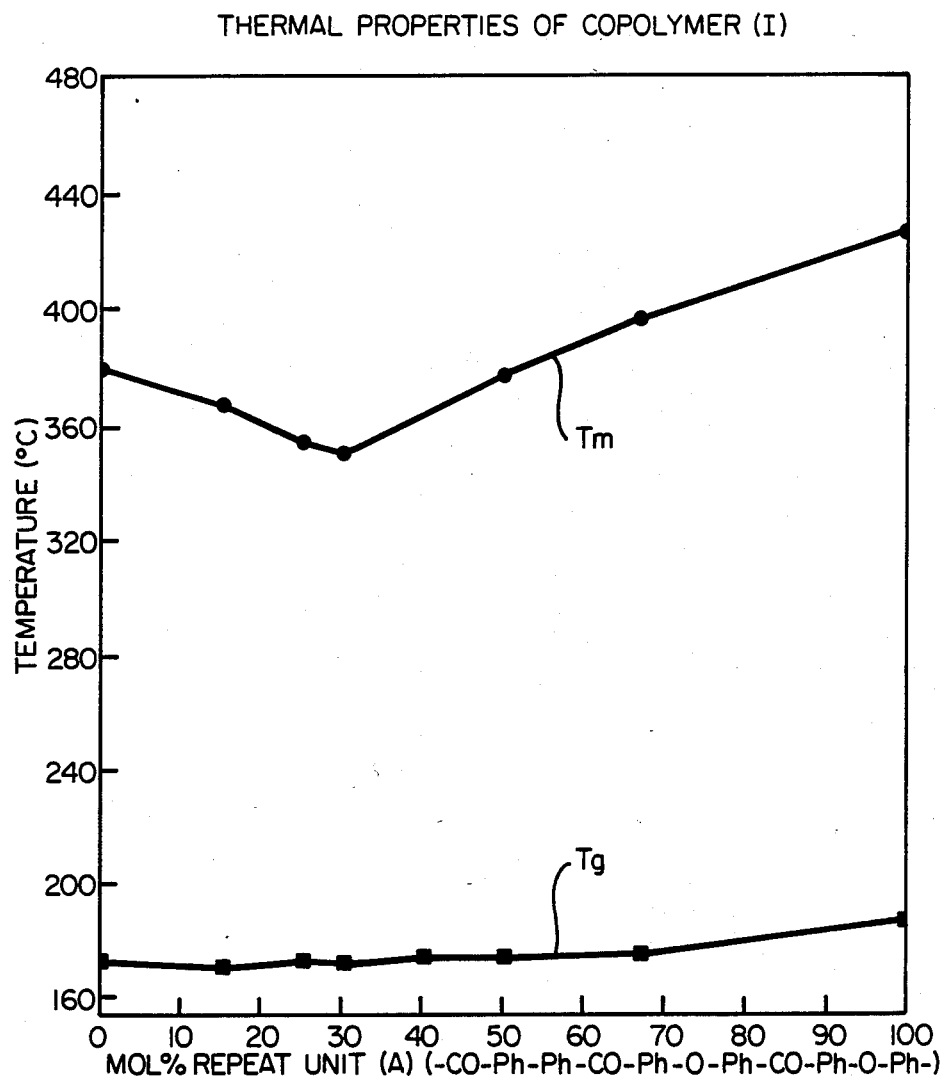
FIG_1

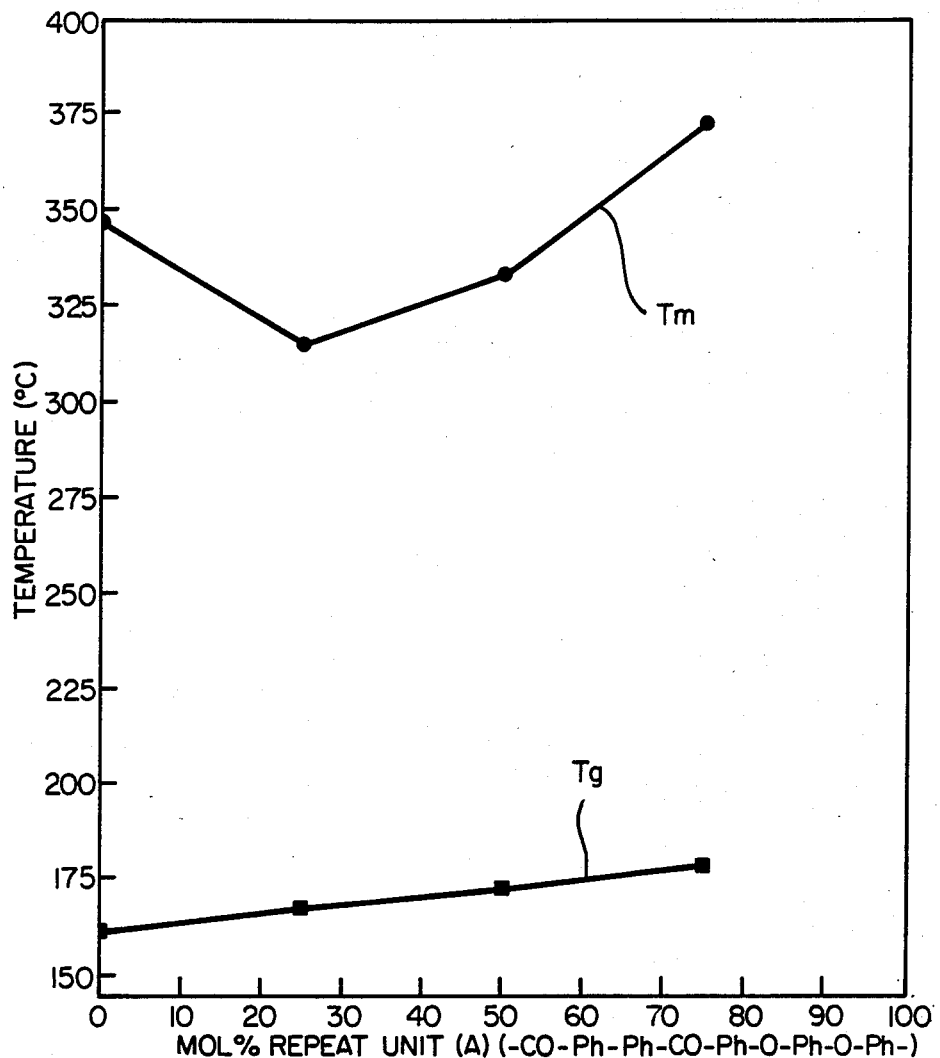
FIG_2

POLY(ARYLENE ETHER KETONES) HAVING BIPHENYLENE-4,4'-DICARBONYL GROUPS

BACKGROUND OF THE INVENTION

This invention relates to novel copoly(arylene ether ketone) having a biphenylene-4,4'-dicarbonyl group in their backbone and to methods for their preparation.

Poly(arylene ether ketones) possess many desirable properties, for example, high temperature stability, mechanical strength, and resistance towards common solvents. They are thermoplastics, facilitating their melt fabrication into articles of diverse sizes and shapes. Many are crystalline and retain substantial mechanical properties up to or about their melting temperatures (Tm), which typically are above 300° C.

While a high Tm is desirable for this reason, too high a Tm is undesirable, because a crystalline poly(arylene ether ketone) must be melt processed at a temperature substantially above its melting point—commonly at least 30° C. above. However, poly(arylene ether ketones) begin decomposing more or less rapidly at about or above 400° C., so that a poly(arylene ether ketone) having a Tm in the near 400° C. would be difficult to melt process without decomposition. For instance, Berr, in U.S. Pat. No. 3,516,966, reports that the polymer from diphenyl ether and terephthaloyl chloride (Tm 385° C.) cannot be practicably melt-processed because it requires an extrusion temperature of 420° C. or higher, but decomposes at temperatures in excess of 400° C. Further, conventional melt processing equipment is frequently not designed for operation at temperatures above 400° C., making specially designed equipment necessary. In view of these considerations, it is desirable for a poly(arylene ether ketone) to have a Tm below about 370° C.

The high-temperature mechanical properties of a poly(arylene ether ketone) are also influenced by its glass transition temperature, or Tg. There is a significant loss in mechanical properties at about or above the Tg, even though for crystalline poly(arylene ether ketones) substantial mechanical properties may still be retained up to the Tm. For a many applications, substantial retention of room temperature properties at 150° C. or above is a requirement. Because of the phenomenon known as densification embrittlement, in which a polymer densifies and embrittles at about its Tg, merely having a Tg at or about 150° C. is insufficient. To avoid densification embrittlement, the Tg should be be significantly above 150° C., preferably about 165° C. or above. Combining the above factors, a poly(arylene ether ketone) having a Tg about or above 165° C. and a Tm about or below 370° C. is highly desirable.

The characteristics of a poly(arylene ether ketone)—Tg, crystallinity, Tm, chemical resistance, etc.—depend on a number of parameters: the ether-to-ketone ratio, the sequencing of subunits, linearity, the presence of meta-substituted and/or non-phenylene arylene groups, and the like. Poly(arylene ether ketones) representing various combinations of these parameters are known. See, for example, Marks, in U.S. Pat. No. 3,441,538; Rose et al., in U.S. Pat. No. 4,320,224; Dahl, in U.S. Pat. Nos. 3,953,400 and 4,111,908; and Dahl et al., in U.S. Pat. No. 3,956,240. This is a continuing search for new polymers of this class having particularly advantageous properties for a desired end use.

Berr, cited supra, illustrates prior art attempts to tailor the Tm of a poly(arylene ether ketone) by altering its molecular composition and the fact that often such manipulations represent trade-offs in which a gain in one property is at the expense of a loss in another property. Noting that the poly(arylene ether ketone)

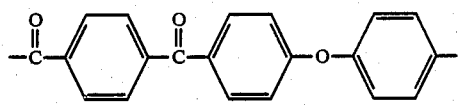

was not melt-processable because of its high Tm, he partially replaced one monomer (terephthaloyl chloride) with another (isophthaloyl chloride). He was able to obtain a melt-processable copoly(arylene ether ketone) having the repeat units

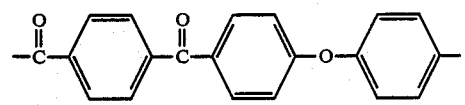

and

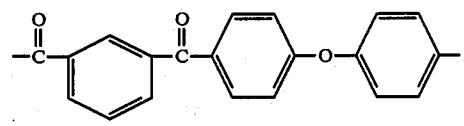

But the meta-phenylene group reduced the crystallinity of the copolymer, so that copolymers having more than 30 mole % isophthaloyl chloride-derived repeat units crystallized only with difficulty. These results illustrate the negative effects of disruptions in the regularity of the polymer backbone. Also, the meta-phenylene group is generally not as thermally and/or chemically stable as para-phenylene, so that mixed para-/meta-copolymers are less stable than their all-para counterparts.

Staniland, in published European application EP No. 184,458,A2, illustrates another attempt to modify the Tm and/or the Tg of a poly(arylene ether ketone) by copolymerization. He noted that while the poly(arylene ether ketone)

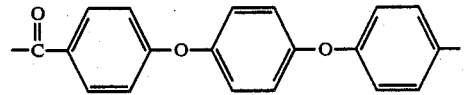

has a Tg of 143° C. and a Tm of 334° C., he was able to lower its Tm by preparing a copolymer in which the second repeat unit

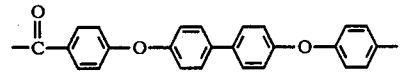

was introduced. For example, the copolymer combining these two repeat units exhibits a minimum in the Tm at about 20 mole % of the second repeat unit (309° C.). Thus, the second repeat unit (whose homopolymer has a Tg of 167° C. and a Tm of 416° C.) has the effect of lowering the Tm. However, the Tg of Staniland's copolymers remains below or about 150° C. and does not rise significantly above this value until the mole % of the second repeat unit is very high, by which time the Tm has also risen to an undesirably high value.

Staniland's copolymer has an ether-to-ketone ratio of 2:1. It has generally been observed that poly(arylene ether ketones) having lower either to ketone ratios, e.g. 1.5:1 or lower, have higher Tg's and are more chemically resistant. Since Staniland's Tm lowering repeat unit has an ether-to-ketone ratio of 2:1, insertion of such a repeat unit into a poly(arylene ether ketone) having an ether-to-ketone ratio of 1.5:1 or lower, would undesirably raise the ether-to-ketone ratio and lower its Tg.

Further, it is known that in poly(arylene ether ketones) a phenylene group flankes by two ether groups is chemically reactive under certain conditions, for example being readily sulfonated, because the electron denoating (activating) effect of the two ether groups is not counteracted by an electron withdrawing groups. Since in a biphenylene group flanked by two ether oxygens the same considerations apply, it is unattractive for incorporation into copoly(arylene ether ketones) for applications requiring superior chemical resistance.

This invention provides copoly(arylene ether ketones) having an ether-to-ketone rato of about 1.5:1 or below and Tg's significantly above 150° C.

SUMMARY OF THE INVENTION

This invention provides a copoly(arylene ether ketone) comprising
(A) a repeat unit

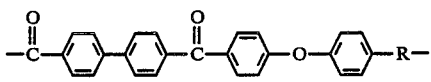

and
(B) a repeat unit selected from the group consisting of

and

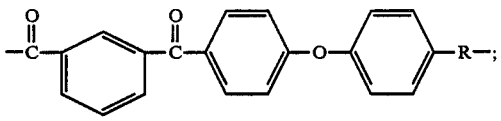

where R, which is the same in each of repeat units (A) and (B), is a direct bond,

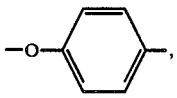

or

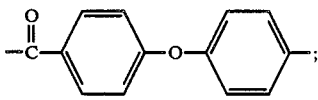

the molar ratio of repeat units (A) to repeat units (B) being between about 10:90 and about 70:30.

The molar ratio of repeat units (A) to repeat units (B) is more preferably between about 10:90 and about 50:50, and most preferably between about 20:80 and about 40:60.

This invention also provides a method of making a copoly(arylene ether ketone), comprising polymerizing, in the presence of a Lewis acid catalyst, a monomer system comprising:
(a) a first comonomer

(b) a second comonomer selected from the group consisting of

and

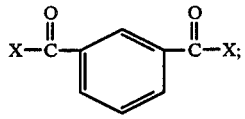

and
(c) a third comonomer selected from the group consisting of diphenyl ether, 4,4'-diphenoxybenzophenone, and 1,4-diphenoxybenzene;
X being a group displaceable under Friedel-Crafts polymerization conditions; the combined molar amounts of the first and second comonomers (a) and (b) being substantially equal to the molar amount of the third comonomer (c); and the molar ratio of first comonomer (a) to second comonomer (b) being between about 10:90 and about 70:30.

BRIEF DESCRIPTION OF THE DRAWINGS

FIG. 1 depicts the effect of composition on the glass transition and crystalline melting temperatures of a copoly(arylene ether ketone) of this invention, prepared by the copolymerization of terephthaloyl chloride, [1,1'-biphenyl]-4,4'-dicarbonyl dichloride, and 4,4'-diphenoxybenzophenone.

FIG. 2 depicts the effect of composition on the glass transition and crystalline melting temperatures of a copoly(arylene ether ketone) of this invention, prepared by the copolymerization of terephthaloyl chloride, [1,1'-biphenyl]-4,4'-dicarbonyl dichloride, and 1,4-diphenoxybenzene.

DETAILED DESCRIPTION OF THE INVENTION

This invention provides copoly(arylene ether ketones) having biphenylene-4,4'-dicarbonyl groups, in particular copolymers having biphenylene-4,4'-dicarbonyl-containing repeat units interspersed with repeat units having no such groups.

While poly(arylene ether ketones) in which the arylene groups are all para-phenylene are crystaline, their replacement with other aromatic moieties, for example meta-phenylene groups or aliphatic groups, may cause a reduction in or loss of crystallinity.

We have discovered that, in a preferred copolymer of our invention, wherein the repeat unit (A) is

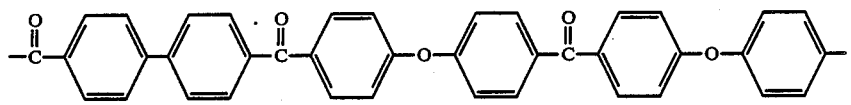

and the repeat unit (B) is

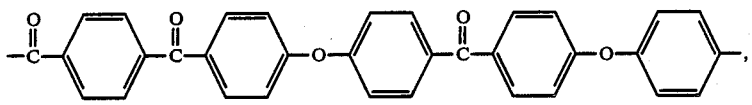

(hereinafter designated copolymer I), the introduction of biphenylene-4,4'-dicarbonyl groups does not substantially negatively affect crystallinity. Rather, the copolymer is highly crystalline. Furthermore, the glass transition temperature Tg unexpectedly remains substantially constant and high over a broad compositional range and yet, at the same time, the crystalline melting temperature Tm, instead of either remaining constant or trending monotonically while composition varies from one extreme to the other, shows a minimum at which the Tm is lower than that of a homopolymer composed exclusively of either repeat unit (A) or (B) alone. FIG. 1 shows how the Tg and Tm of this copolymer vary in going from 0 to 100 mole % repeat unit (A). The Tg of the copolymer remains desirably at about or above 165° C., while its Tm drops to a minimum of about 349° C. at about 30 mole % repeat unit (A).

Another preferred copolymer of our invention, wherein the repeat unit (A) is

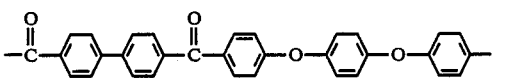

and the repeat unit (B) is

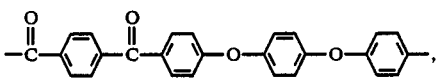

(hereinafter designated copolymer II), also shows the desirable characteristics of a minimum in Tm as its repeat unit (A) content is varied from 0 to 100 mole % while at the same time retaining a high Tg.

To illustrate the unexpectedness and uniqueness of copoly- or poly(arylene ether ketones) having these desirable features of copolymers I and II, Table I compares the Tg's and Tm's these two copolymers and some prior art poly(arylene ether ketones). The prior art poly(arylene ether ketones) either have a Tg below 165° C. or a Tm above 370° C., or both. In contrast, at 30 mole % repeat unit (A), copolymer I has a Tg of 172° C. and a Tm of 349° C., and at 25 mole % repeat unit (A), copolymer II has a Tg of 167° C. and a Tm of 314° C.

TABLE I

| Poly = (arylene ether ketone) | Tg (°C.) | Tm (°C.) |
|---|---|---|
| —CO—Ph—O—Ph— (1,2) | 163 | 361 |
| —CO—Ph—O—Ph—O—Ph— (3) | 144 | 335 |
| —CO—Ph—Ph—O—Ph—O—Ph— (3) | 167 | 416 |
| —CO—Ph—CO—Ph—O—Ph—O—Ph— (3) | 154 | 358 |
| —CO—Ph—CO—Ph—O—Ph— (4) | 185 | 385 |
| I (30 mole % repeat unit (A)) | 172 | 349 |
| II (25 mole % repeat unit (A)) | 167 | 314 |

(1) Ph designates p-phenylene
(2) Marks, U.S. Pat. No. 3,441,538 (1969)
(3) Attwood et al., Polymer 22, 1096 (1981)
(4) Sterzel, DE 3,241,444 (1983)

The copolymers of our invention are conveniently prepared by Friedel-Crafts or electrophilic polymerization, in which during the polymerization step an carboxylic acid halide reacts with an aromatic group having a hydrogen activated to Friedel-Crafts reaction to form an aryl ketone group, in the presence of a Lewis acid catalyst. A preferred monomer system for Friedel-Crafts polymerization comprises:

(a) a first comonomer $$X-\overset{O}{\underset{\|}{C}}-\text{Ph}-\text{Ph}-\overset{O}{\underset{\|}{C}}-X;$$

(b) a second comonomer selected from the group consisting of $$X-\overset{O}{\underset{\|}{C}}-\text{Ph}-\overset{O}{\underset{\|}{C}}-X$$

and $$X-\overset{O}{\underset{\|}{C}}-\text{Ph}-\overset{O}{\underset{\|}{C}}-X;$$

and (c) a third comonomer selected from the group consisting of diphenyl ether, 4,4'-diphenoxybenzophenone, and 1,4-diphenoxybenzene.

X is a group displaceable under Friedel-Crafts polymerization conditions and is preferably halide, especially chloride, or OR', where R' is lower alkyl, for example isopropyl, ethyl, or methyl. A preferred first monomer is [1,1'-biphenyl]-4,4'-dicarbonyl dichloride and preferred second monomers are terephthaloyl chloride and isophthaloyl chloride.

The combined molar amounts of the first and second comonomers (a) and (b) should be substantially equal to the molar of the third comonomer (c), to ensure attainment of high molecular weights. A slight stoichiometric imbalance in the comonomers can be employed, for the purpose of molecular weight control or capping, as is well known in the art and is discussed in more detail hereinbelow. For example, the combined amounts of comonomers (a) and (b) can b in slight excess over the amount of comonomer (c), or vice-versa.

The molar ratio of the first comonomer (a) to the second comonomer (b) can vary from 10:90 to 70:30, is preferably between about 10:90 and about 50:50, and is most preferably between about 20:80 and about 40:60.

In addition to comonomers (a), (b), and (c), small amounts of other comonomers may be utilized, provided they are in amounts so as to not affect the essential character of the copolymers of this invention and stoichiometric adjustments, if necessary, are made for their presence, so as not to prevent high molecular weights. Examples of suitable additional monomers include 4,4'-diphenoxydiphenyl sulfone, naphthalene-1,4-dicarbonyl dichloride, naphthalene-2,6-dicarbonyl dichloride, naphthalene-3,6-dicarbonyl dichloride, p-phenoxybenzoyl chloride, and the like.

The term "Lewis acid" is used herein to refer to a substance which can accept an unshared electron pair from another molecule. Lewis acids which may be used in the practice of this invention include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. A preferred Lewis acid is aluminum trichloride.

A preferred Friedel-Crafts process for the preparation of the polymers of this invention comprises using hydrogen fluoride and boron trifluoride as the reaction medium. This process is described by Dahl in U.S. Pat. Nos. 3,953,400 and 4,247,682 and and by Dahl et al. in U.S. Pat. No. 3,956,240, the disclosures of which are incorporated herein by reference.

A most preferred Friedel-Crafts process for preparing the polymers of this invention is described by Jansons et al. in published PCT application No. WO 84/03891, the disclosure of which is incorporated herein by reference. This application discloses a method of moderating or controlling Friedel-Crafts polymerizations by the addition of a Lewis base which acts as a controlling agent or by using specified excesses of the Lewis acid.

Preferred Lewis bases include diphenyl sulfone, dimethyl sulfone, N-methylformamide, N,N-dimethylformamide, N,N-dimethylacetamide, 1-methyl-2-pyrrolidone, tetramethylene sulfone (also known as sulfolane), n-butyronitrile, dimethyl sulfide, imidazole, acetone, benzophenone, trimethylamine, trimethylamine hydrochloride, tetramethylammonium chloride, pyridine-N-oxide, 1-ethylpyridinium chloride, lithium chloride, lithium bromide, sodium chloride, potassium chloride potassium bromide, and mixtures thereof. Particularly preferred Lewis bases are lithium chloride, N,N-dimethylformamide, and dimethyl sulfone.

The amount of Lewis base present should be from 0 to about 4 equivalents per equivalent of acid halide groups present in the monomer system. Amounts greater than 4 equivalents could be employed, if desired. However, no additional controlling effect is usually achieved by adding larger amounts. thus, it is preferred to use no more than about 4 equivalents and generally no more than about 2 equivalents. When a Lewis base is added to control the reaction, at least about 0.01, preferably at least about 0.05 and most preferably at least about 0.5 equivalents of Lewis base per equivalent of acid halide groups present should be used.

The temperatures at which the reaction is conducted is not critical and can be from about $-70°$ C. to about $+150°$ C., or even higher. It is preferred to start the reaction at lower temperatures, for example at $-50°$ to about $-10°$ C., particularly if the monomer system contains highly reactive monomers. After polymerization has commenced, the temperature can be raised if desired, for example, to increase the rate of reaction. It is generally preferred to carry out the reaction at temperatures in the range of between $-30°$ and $+25°$ C. (room temperature).

The reaction may also be moderated by use of an appropriate excess of Lewis acid. In general, the amount of Lewis acid is used in amount of at least one equivalent per equivalent of carbonyl and other basic groups present in the reaction mixture, plus an amount effective to act as a catalyst. In preparing the copolymers of this invention the catalytically effective amount should be between about 0.003 and about 0.5 equivalent per equivalent of acid halide groups.

The polymerization may be carried out in the presence of a non-protic—also known as aprotic—diluent. Preferred non-protic diluents include methylene chloride, carbon disulfide, o-dichlorobenzene, 1,2,4-trichlorobenzene, o-difluorobenzene, 1,2-dichloroethane, 1,1,2,2-tetrachloroethane, and the like.

The polymers of this invention are preferably high molecular weight polymers. By "high molecular weight," it is meant a polymer having an inherent viscosity greater than about 0.6 dL/g. Preferably the polymer has an inherent viscosity in the range of about 0.6 to about 2.0 dL/g. Polymers having an inherent viscosity below about 0.6 are generally not useful because they have poor mechanical properties, such as low tensile strength and elongation, while polymers having an inherent viscosity above about 2.0 are very difficult to melt process. Throughout this application, inherent viscosity refers to the mean inherent viscosity determined according to the method of Sorenson et al., "Preparative Methods of Polymer Chemistry", 2nd ed. (Interscience 1968), at page 44 (0.1 g polymer dissolved in 100 mL of concentrated sulfuric acid at 25° C.).

If desired, the molecular weight of the polymer, the degree of branching, and the amount of gelation can be controlled by use of, for example, capping agents as described by Dahl in U.S. Pat. No. 4,247,682, the disclosure of which is incorporated herein by reference. The molecular weight of the polymer can also be controlled by employing a slight excess of one of the monomers.

Capping agents, when employed, are added to the polymerization reaction medium to cap the polymer on at least one end of the polymer chain. This terminates continued growth of the chain and controls the resulting molecular weight of the polymer, as shown by the inherent viscosity of the polymer. Judicious use of the capping agents results in a polymer within a selected narrow molecular weight range, decreased gel formation during polymerization, and decreased branching of the polymer chains and increases melt stability. Both nucleophilic and electrophilic capping agents can be used to cap the polymer at each end of the chain.

Preferred nucleophilic capping agents are 4-chlorobiphenyl, 4-phenoxybenzophenone, 4-(p-phenoxyphenoxy)benzophenone, biphenyl, 4-benzenesulfonylphenyl phenyl ether, and the like.

Typical electrophilic capping agents are compounds of the formula

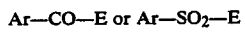

wherein Ar is phenyl, 3-chlorophenyl, 4-chlorophenyl, 4-cyanophenyl, 4-methylphenyl, naphthyl, biphenyl, or an aromatic group substituted with an electron withdrawing substituent and E is halogen or other leaving group, preferably chloride. Preferred electrophilic capping agents include benzoyl chloride, benzenesulfonyl chloride, and the like.

Because of a Lewis acid is used, the resulting polymer contains Lewis acid complexed to its carbonyl groups. For many polymerizations, the Lewis acid is complexed to substantially all the carbonyl groups in the polymer. As is well known with polymers of this type, the catalyst residue must be removed, i.e., the Lewis acid must be decomplexed from the polymer and removed. A method for removing the catalyst residue is described by Dahl in U.S. Pat. No. 4,237,884, the disclosure of which is incorporated herein by reference.

Decomplexation may be accomplished by treating the polymerization reaction mixture with a decomplexing base after completion of polymerization. The base may be added to the reaction medium or the reaction medium can be added to the base. The decomplexing base must be at least as basic towards the Lewis acid as the basic groups on the polymer chain. Such decomplexation should be effected before the isolation of the polymer from the reaction mixture.

The amount of decomplexing base used should be in excess of the total amount of bound (complexed) and unbound Lewis acid present in the reaction mixture and is preferably twice the total amount of Lewis acid. Typical decomplexing bases which can be used include water, dilute aqueous hydrochloric acid, methanol, ethanol, acetone, N,N-dimethylformamide, N,N-dimethylacetamide, pyridine, dimethyl ether, diethyl ether, tetrahydrofuran, trimethylamine, trimethylamine hydrochloride, dimethyl sulfide, tetramethylene sulfone, benzophenone, tetramethylammonium chloride, isopropanol, and the like. The decomplexed polymer can then be recovered by conventional techniques such as separating the polymer by filtration; adding a nonsolvent for the polymer which is a solvent for or miscible with the Lewis acid/Lewis base complex and the Lewis acid; spraying the reaction medium into a nonsolvent for the polymer; or evaporating the volatiles from the reaction medium and then washing with an appropriate solvent to remove any remaining base/catalyst complex and diluent from the polymer.

In the recovery of the polymer from the reaction mixture, the reaction mixture can be liquefied, if desired, by the method described by Reamey in U.S. Pat. No. 4,665,151, the disclosure of which is incorporated herein by reference.

The copolymers of this invention may also be prepared by a nucleophilic polymerization process, i.e. a polymerization in which an aryl ether linkage is formed in the polymerization step. The nucleophilic polymerization techniques generally disclosed by Rose, U.S. Pat. No. 4,320,224, and Attwood et al., Polymer 22, 1096 (1981), the disclosures of which are incorporated herein by reference, may be employed.

For example, copolymer I of this invention may be prepared nucleophilically for polymerizing a mixture of 4,4'-bis(4-fluorobenzoyl)biphenyl and 1,4-bis(4-fluorobenzoyl)benzene with a substantially stoichiometric amount of 4,4'-dihydroxybenzophenone. An alternative nucleophilic synthesis of the same polymer is the polymerization of a mixture of 4,4'-bis(4-hydroxybenzoyl)biphenyl and 1,4-bis(4-hydroxybenzoyl)benzene with a substantially stoichiometric amount of 4,4'-difluorobenzophenone.

Similarly, copolymer II of this invention may be prepared nucleophilically by the polymerization of a mixture of 4,4'-bis(fluorobenzoyl)biphenyl and 1,4-bis(4-fluorobenzoyl)benzene with a substantially stoichiometric amount of hydroquinone.

EXAMPLE 1

A 500 mL round-bottom flask equipped with a reflux condenser, nitrogen inlet, and magnetic stirrer was charged with chlorobenzene (150 mL), thionyl chloride (44.1 mL, 0.605 mol), and N,N-dimethylformamide (1 mL). 4,4'-Biphenyldicarboxylic (24.2 g, 0.102 mol) was added, with stirring The reaction mixture was heated at reflux for about 4 hrs, at the end of which period it was a bright orange homogeneous solution. Excess thionyl chloride was distilled off under reduced pressure (water aspirator). The warm residual solution was poured into a mixture of hexanes (300 mL), yielding a pale yellow precipitate.

The product was isolated by filtration, washed with hexanes, and vacuum dried at 100° C. overnight. Two sublimations (165° C./0.05 mm Hg) afforded polymerization grade [1,1'-biphenyl]-4,4'-dicarbonyl dichloride, mp 185.5°–187° C.

EXAMPLE 2

[1,1'-Biphenyl]-4,4'-dicarbonyl dichloride, terephthaloyl chloride, and 4,4'-diphenoxybenzophenone were polymerized according to the following general procedure, with the exact amount of monomers and capping agent provided in Table II, below.

A 100 mL resin kettle, fitted with a mechanical stirrer and a nitrogen inlet, was charged with methylene chloride (20 mL). The temperature was lowered to −30° C. Aluminum trichloride (136.6 to 136.8 mmol, depending on the exact run) and dimethyl sulfone (37.5 mmol) was added, and the contents of the kettle were stirred at a moderate rate. When the exotherm had subsided, the [1,1'-biphenyl]-4,4'-dicarbonyl dichloride and terephthaloyl chloride were quantitatively transferred to the kettle, with a methylene chloride (8 mL) rinse to ensure quantitative transfer. The resulting slurry was stirred for a few minutes. Next, 4,4'-diphenoxybenzophenone (slight stoichiometric excess) and benzoyl chloride were added, with a methylene chloride (4 mL) rinse. The benzoyl chloride, along with the stoichiometric excess of 4,4'-diphenoxybenzophenone served to double cap the polymer.

The reaction was allowed to warm to ambient temperature (ca. 20° C.) where it quickly became a homogeneous orange/red solution. The solution was stirred for about 40 min until the viscosity increased and an orange gel formed. The reaction was allowed to continue, for a total reaction time of between 4 and 6 hrs.

At the completion of the reaction, the orange gel was broken up by hand stirring and decomplexed in 0.15% aqueous hydrochloric acid (500 mL). The resulting white polymer was isolated by filtration and washed with tap water (3×500 mL). The polymer was then digested at reflux overnight in 0.15% aqueous hydrochloric acid, isolated by filtration, and washed with tap water (3×500 mL). Next, the polymer was heated at reflux for 1 hr in 0.15% aqueous ammonium hydroxide (500 mL), isolated by filtration, and washed with tap water (3×500 mL). Finally, the polymer was dried in vacuo overnight at 165° C.

The polymers thus obtained had a repeat unit (A)

$$-\overset{O}{\underset{\parallel}{C}}-\phenyl-\phenyl-\overset{O}{\underset{\parallel}{C}}-\phenyl-O-\phenyl-\overset{O}{\underset{\parallel}{C}}-\phenyl-O-\phenyl-$$

and a repeat unit (B)

$$-\overset{O}{\underset{\parallel}{C}}-\phenyl-\overset{O}{\underset{\parallel}{C}}-\phenyl-O-\phenyl-\overset{O}{\underset{\parallel}{C}}-\phenyl-O-\phenyl-,$$

with the (A)/(B) ratios varying according to the monomer ratios employed. The inherent viscosity and glass transition (Tg) and crystalline melting (Tm) points of the polymers are given in Table II.

TABLE II

| Run | Monomers & capping agt. (mmol) | | | | Inh. Vis. (dL/g) | Tg (°C.) | Tm (°C.) |
| --- | --- | --- | --- | --- | --- | --- | --- |
| | (a) | (b) | (c) | (d) | | | |
| 1 | 3.75 | 21.25 | 25.45 | 0.90 | 0.92 | 171 | 366 |
| 2 | 7.5 | 17.5 | 25.5 | 1.0 | 0.86 | 172 | 349 |
| 3 | 12.5 | 12.5 | 25.45 | 0.90 | 0.90 | 173 | 376 |
| 4 | 16.8 | 8.2 | 25.5 | 1.0 | 0.83 | 174 | 396 |
| 5 | 25.0 | 0 | 25.5 | 1.0 | 0.82 | 186 | 426 |

(a) = [1,1'-biphenyl]-4,4'-dicarbonyl dichloride
(b) = terephthaloyl chloride
(c) = 4,4'-diphenoxybenzophenone
(d) = benzoyl chloride

EXAMPLE 3

[1,1'-Biphenyl]-4,4'-dicarbonyl dichloride, terephthaloyl chloride, and 1,4-diphenoxybenzene were copolymerized following the general procedure of Example 2, except that (a) N,N-dimethylformamide (96.0 mmol) was used as the Lewis base instead of dimethyl sulfone, (b) the amount of aluminum trichloride used was 176.6 mmol, (c) the total amount of methylene chloride used was 44 mL (30 mL initial charge, balance to rinses) and (d) the amount of monomers and capping agent are as provided in Table III.

The polymers obtained had a repeat unit (A)

$$-\overset{O}{\underset{\parallel}{C}}-\phenyl-\phenyl-\overset{O}{\underset{\parallel}{C}}-\phenyl-O-\phenyl-O-\phenyl-$$

and a repeat unit (B)

$$-\overset{O}{\underset{\parallel}{C}}-\phenyl-\overset{O}{\underset{\parallel}{C}}-\phenyl-O-\phenyl-O-\phenyl-,$$

with the (A)/(B) ratio varying according to the monomer ratios employed. The inherent viscosity, Tg, and Tm of the polymers are given in Table III.

TABLE III

| Run | Monomers & capping agt. (mmol) | | | | Inh. Vis. (dL/g) | Tg (°C.) | Tm (°C.) |
| --- | --- | --- | --- | --- | --- | --- | --- |
| | (a) | (b) | (c) | (d) | | | |
| 1 | 8.0 | 24.0 | 32.3 | 0.5 | 1.49 | 167 | 318 |
| 2 | 16.0 | 16.0 | 32.3 | 0.5 | 1.39 | 173 | 333 |
| 3 | 24.0 | 8.0 | 32.3 | 0.5 | 1.38 | 178 | 373 |

(a) = [1,1'-biphenyl]-4,4'-dicarbonyl dichloride
(b) = terephthaloyl chloride
(c) = 1,4-diphenoxybenzene
(d) = benzoyl chloride

We claim:
1. A copoly(arylene ether ketone) comprising
(A) a repeat unit

$$-\overset{O}{\underset{\parallel}{C}}-\phenyl-\phenyl-\overset{O}{\underset{\parallel}{C}}-\phenyl-O-\phenyl-R-$$

and
(B) a repeat unit selected from the group consisting of $$-\overset{O}{\underset{\parallel}{C}}-\phenyl-\overset{O}{\underset{\parallel}{C}}-\phenyl-O-\phenyl-R-$$

and $$-\overset{O}{\underset{\parallel}{C}}-\phenyl-\overset{O}{\underset{\parallel}{C}}-\phenyl-O-\phenyl-R-;$$

where R, which is the same in each of repeat units (A) and (B), is a direct bond, $$-O-\phenyl-,$$

or $$-\overset{O}{\underset{\parallel}{C}}-\phenyl-O-\phenyl-;$$

the molar ratio of repeat units (A) to repeat units (B) being between about 10:90 and about 70:30.

2. A copoly(arylene ether ketone) according to claim 1 wherein the molar ratio of repeat units (A) to repeat units (B) is between about 10:90 and about 50:50.

3. A copoly(arylene ether ketone) according to claim 1 or claim 2 wherein R is a direct bond.

4. A copoly(arylene ether ketone) according to claim 1 or claim 2 wherein R is

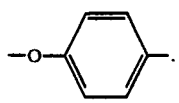

5. A copoly(arylene ether ketone) according to claim 1 or claim 2 wherein R is

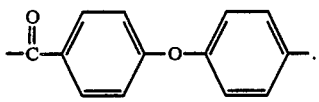

6. A copoly(arylene ether ketone) according to claim 1 or claim 2 wherein repeat unit (A) is

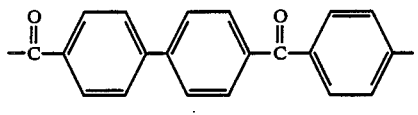

and repeat unit (B) is

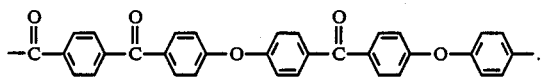

7. A copoly(arylene ether ketone) according to claim 1 or claim 2 wherein repeat unit (A) is

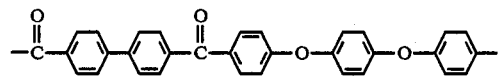

and repeat unit (B) is

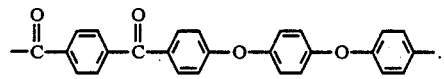

8. A copoly(arylene ether ketone) according to claim 1 or claim 2 having an inherent viscosity between about 0.6 and about 2.0 dL/g.

9. A method of making a copoly(arylene ether ketone), comprising polymerizing, in the presence of a Lewis acid catalyst, a monomer system comprising:

(a) a first comonomer

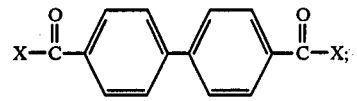

(b) a second comonomer selected from the group consisting of

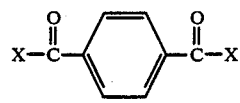

and

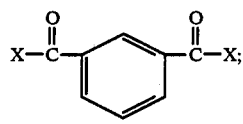

and (c) a third comonomer selected from the group consisting of diphenyl ether, 4,4'-diphenoxybenzophenone, 1,4-diphenoxybenzene;

X being a group displaceable under Friedel-Crafts polymerization conditions; the combined molar amounts of the first and second comonomers (a) and (b) being substantially equal to the molar amount of the third comonomer (c); and the molar ratio of the first comonomer (a) to the second comonomer (b) being between about 10:90 about about 70:30 .

10. A method according to claim 9, wherein the molar ratio of the first comonomer (a) to the second comonomer (b) is between about 10:90 and about 50:50.

11. A method according to claim 9, wherein monomer (a) is [1,1'-biphenyl]-4,4'-dicarbonyl dichloride, monomer (b) is terephthaloyl chloride, and monomer (c) is 4,4'-diphenoxybenzophenone.

12. A method according to claim 9, wherein monomer (a) is [1,1'-biphenyl]-4,4'-dicarbonyl dichloride, monomer (b) is terephthaloyl chloride, and monomer (c) is 1,4-diphenoxybenzene.

13. A method according to claim 9, wherein the Lewis acid catalyst is aluminum trichloride.

14. A method according to claim 9, wherein a Lewis base is also present during the polymerization.

15. A method according to claim 14, wherein the Lewis base is lithium chloride, N,N-dimethylformamide, or dimethylsulfone.

* * * * *